Feb. 26, 1935. W. LA HODNY ET AL 1,992,828
BRACKET FOR MIRRORS AND THE LIKE
Filed April 26, 1933   5 Sheets-Sheet 2
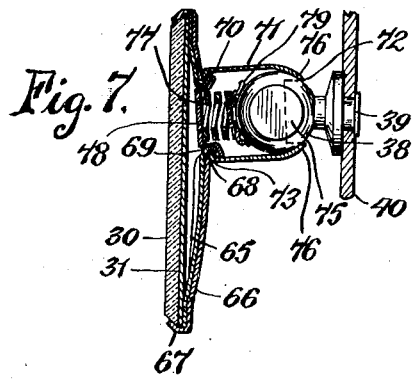
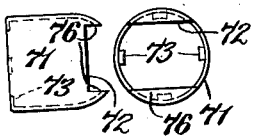
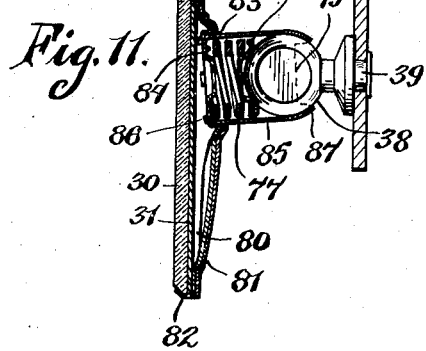
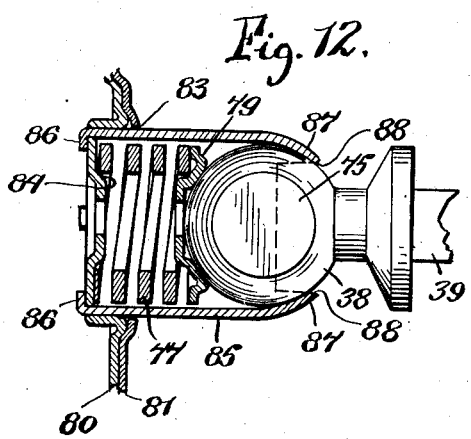
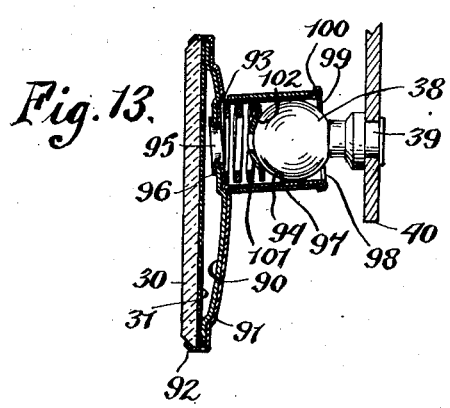
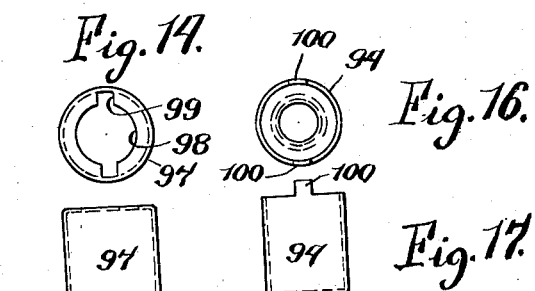
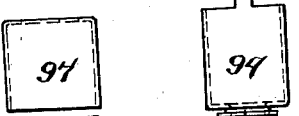
Inventors.
William La Hodny
and William Szyminski
by Popp and Powers
Attorneys.

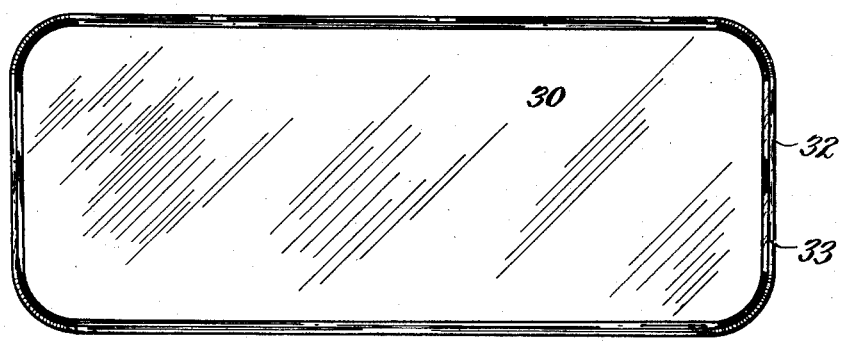
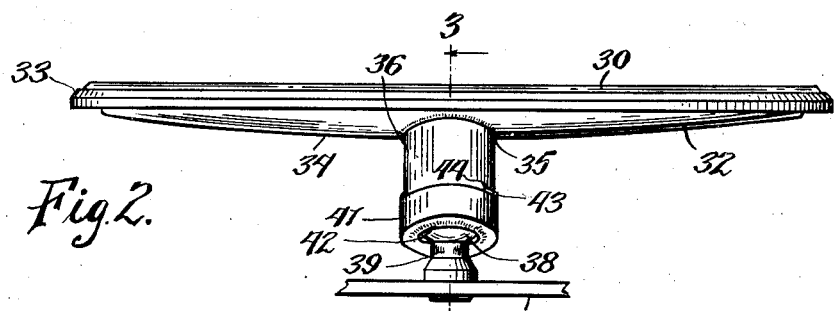
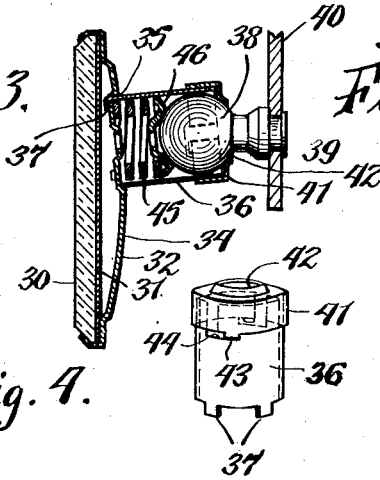
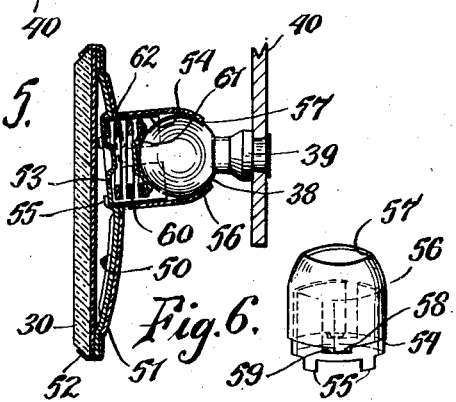

Feb. 26, 1935. W. LA HODNY ET AL 1,992,828
BRACKET FOR MIRRORS AND THE LIKE
Filed April 26, 1933 5 Sheets-Sheet 3

Inventors.
William La Hodny and
William Szyminski
by Popp and Powers
Attorneys.

Feb. 26, 1935.  W. LA HODNY ET AL  1,992,828
BRACKET FOR MIRRORS AND THE LIKE
Filed April 26, 1933  5 Sheets-Sheet 4
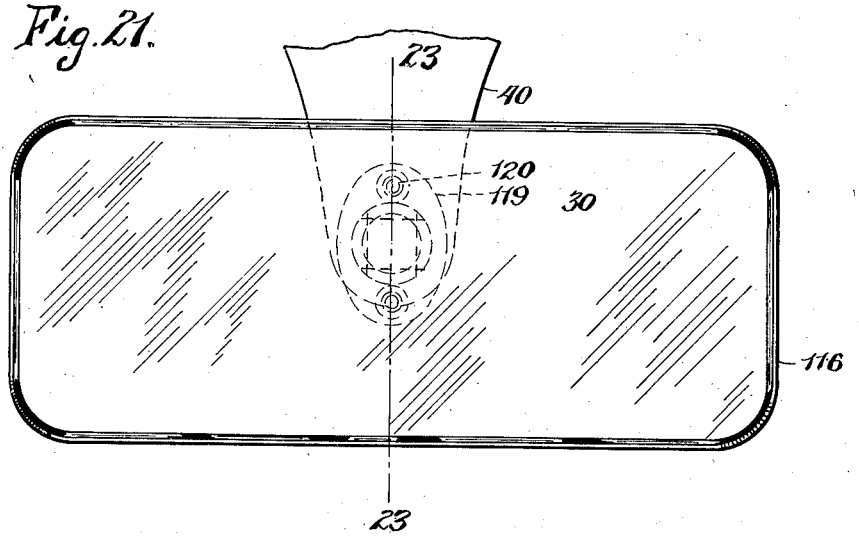
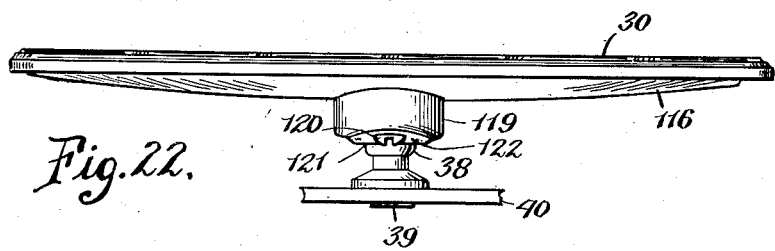
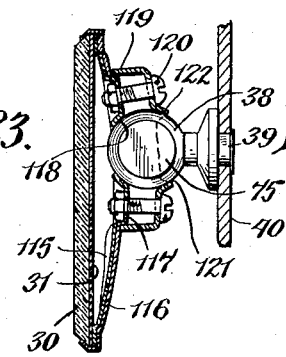 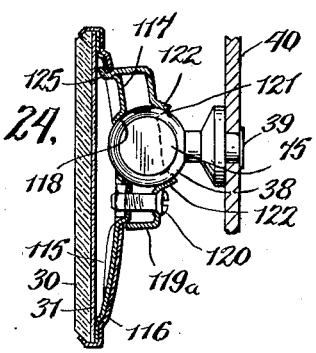
Inventors.
William La Hodny and
William Szyminski
by Popp and Powers
Attorneys.

Feb. 26, 1935. W. LA HODNY ET AL 1,992,828
BRACKET FOR MIRRORS AND THE LIKE
Filed April 26, 1933  5 Sheets-Sheet 5

Inventors.
William La Hodny and
William Szyminski
by Popp and Powers
Attorneys.

Patented Feb. 26, 1935

1,992,828

UNITED STATES PATENT OFFICE 1,992,828

BRACKET FOR MIRRORS AND THE LIKE

William La Hodny, Buffalo, and William Szyminski, Lakeview, N. Y., assignors to Standard Mirror Company, Inc., Buffalo, N. Y., a corporation of New York Application April 26, 1933, Serial No. 668,056

10 Claims. (Cl. 45—97)

This invention relates to a rear vision mirror mounting and more particularly to a universal mounting for supporting a rear vision mirror from the head bar of an automobile windshield so that the driver can adjust the mirror to obtain a view of the road in rear of his automobile through the rear window of the car.

The principal object of this invention is to provide a rear vision mirror mounting which is neat and attractive in appearance, especially when viewed from the front through the windshield and avoids the display of unsightly flanges, screws and other mechanical parts of rear vision mirror mountings, especially those parts which form a part of the universal connection between the supporting bracket and the mirror.

Another object is to provide such a mounting which can be produced at very low cost and is composed of but few inexpensive parts and is at the same time rugged and durable in construction and easily removed to any desired position about its universal joint.

Another purpose is to provide a rear vision mirror in which the mirror is encased in a backing plate, the edges of which are turned over the edge of the mirror so as to completely frame the mirror. By this means the silver part of the mirror is entirely encased and protected against injury and by encasing the entire back and edges of the mirror the mirror is protected against being broken by an accidental blow and hence the present invention permits of using a much lighter mirror. For this purpose the backing plate is preferably made of light metal which can be readily spun or turned around the margin of the mirror and to provide a strong and durable support for the mirror an additional heavier backing plate is provided, this backing plate being interposed between the casing plate and the mirror and being formed to provide a part of the universal mounting for the mirror.

Another aim is to provide such a mirror mounting which is so designed that the universal joint can be arranged at any place along the back of the mirror, thereby permitting the invention to be employed under the different conditions imposed by the designer of the automobile mounting.

Another object is to provide a rear vision mirror which can be quickly detached from its mounting by merely turning the mirror a quarter turn and removing it from the mounting, the ball support for the mirror being provided, for this purpose, with two opposite flattened sides and the ball housing being so formed as to release the ball when the mirror is turned to its quarter position.

In the accompanying drawings:

Fig. 1 is a front elevation of a rear vision mirror made in accordance with our invention.

Fig. 2 is a top plan view thereof.

Fig. 3 is a vertical section taken on line 3—3, Fig. 2.

Fig. 4 is a perspective view of the housing for the universal joint shown in Figs. 1-3 and showing the bayonet slot connection for the cap thereof.

Fig. 5 is a view similar to Fig. 3 showing a modified form of the invention.

Fig. 6 is a perspective view, similar to Fig. 4, of the form of the invention shown in Fig. 5.

Fig. 7 is a view similar to Figs. 3 and 5 and showing a further modified form of the invention.

Fig. 8 is a fragmentary rear elevation of the inner mirror backing plate in the form of the invention shown in Fig. 7.

Fig. 9 is a side elevation of the detached housing for the universal connection in the form of the invention shown in Fig. 7.

Fig. 10 is a rear elevation of this housing member.

Fig. 11 is a vertical section similar to Fig. 7 showing a further modified form of the invention.

Fig. 12 is an enlarged fragmentary section similar to Fig. 11.

Fig. 13 is a vertical section similar to Figs. 3, 5, 7 and 11 and showing a further modification of the invention.

Fig. 14 is a rear elevation of the outer housing member for the universal joint in the form of the invention shown in Fig. 13.

Fig. 15 is a side elevation of this housing member.

Fig. 16 is a rear elevation of the inner housing member for the universal joint in the form of the invention shown in Fig. 13.

Fig. 17 is a side elevation of the inner housing member shown in Fig. 16.

Fig. 21 is a view similar to Figs. 1 and 18 and showing a further modified form of our invention.

Fig. 22 is a top plan view thereof.

Fig. 23 is a vertical section taken on line 23—23, Fig. 21.

Fig. 24 is a section similar to Fig. 23 showing a modified form of the invention.

Similar reference numerals represent similar parts in each of the several views.

Figure 18:
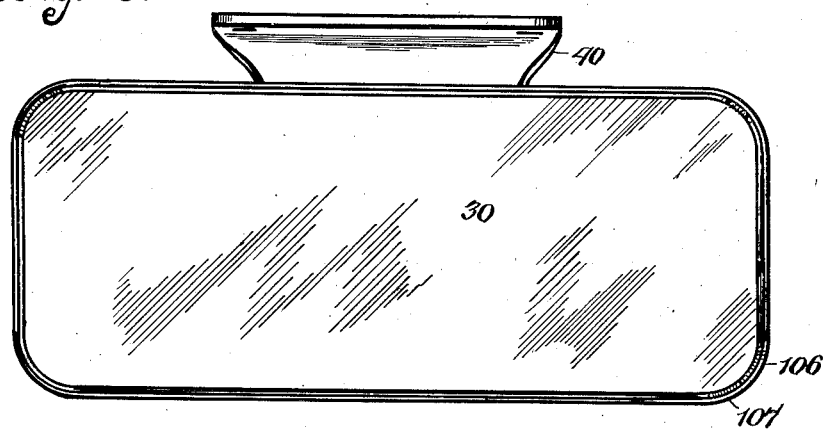
Fig. 18 is a view similar to Fig. 1 showing a further modified form of our invention.

In the form of the invention shown in Figs. 1–5 the numeral 30 represents a rear vision mirror panel which can be of any suitable form but is preferably beveled and is provided on its rear side with the usual coating of silver 31 or other suitable reflective metal. The mirror panel 30 is provided with a sheet metal backing plate 32, the edges 33 of which are preferably spun or turned over the margin of the mirror, as best indicated in Figs. 1 and 2. The central part 34 of the backing plate 32 is also preferably bulged rearwardly, as best shown in Fig. 2. At the place of attachment for the universal connection the metal backing plate 32 is preferably recessed inwardly, as indicated at 35 and in this recess 35 is fitted a tubular housing 36. This tubular housing 36, as best shown in Fig. 5, is provided with a plurality of fingers 37 at one end and the backing plate 32 is provided with openings in the outer part of the recess 35 which receive the fingers 37, the fingers 37 being bent over, as best shown in Fig. 3 so as to securely attach the tubular housing 36 to the backing plate 32. Arranged within the tubular housing is a ball 38 having a stem 39 which is rigidly secured in any suitable manner to a supporting bracket 40. This supporting bracket 40 is attached to the usual head bar (not shown) of the automobile. The ball 38 is retained in the tubular housing 36 by a cap 41 which is provided with an opening 42. This opening embraces the stem 39 and the cap, adjacent this opening 42, is formed to provide a seat which engages the rear face of the ball 38. The cap fits over the tubular housing 36 and is formed to provide a pair of fingers 43 which extend inwardly and engage a bayonet slot 44 in the tubular housing 36. It is apparent that the mirror can be readily removed by turning the cap 41 relative to the tubular housing 36 so as to release the bayonet connection between these parts, whereupon the mirror and the tubular housing can be readily withdrawn from the ball 38 and the cap 41. In order to obtain a yielding frictional contact between the ball 38 and the seat in the cap 41 which frictional contact holds the mirror in any adjusted position and at the same time permits it to be moved to any other position, a spring 45 is arranged in the tubular housing 36 and interposed between the ball 38 and the mirror backing plate 32. This spring 45 is of helical form and is preferably square in cross section, one end of this spring seating in the recess 35 in the backing plate 32 and its opposite end bearing against a washer 46. The opposite side of the washer 46 is formed to provide a seat which bears against the front side of the ball 38 and, under the influence of the spring 46, presses the ball against the seat in the cap 41, thereby obtaining a firm frictional connection between the ball 38 and the cap 41 and providing a vibrationless mounting for the mirror at the same time permitting the mirror to be moved to any desired position.

In the form of the invention shown in Figs. 5 and 6 the mirror plate 30 is provided with an inner backing plate 50 of relatively heavy gage metal and this inner backing plate 50 is provided with an additional backing plate 51 which is of relatively light gage metal, the edges 52 of the light outer backing plate 51 being spun over the margins of the inner backing plate 50 and the mirror plate 30. By this means a backing plate of the necessary thickness to provide a firm anchorage for the universal ball housing is provided and at the same time a light backing plate is provided which can be readily spun over the edges of the mirror. The rear backing plate can also be easily lithographed or enameled to provide any desired color effect. As in the form of the invention shown in Figs. 1–4, the inner backing plate 50 is formed to provide a recess 53 and in this recess is fitted a tubular ball housing 54, this tubular housing 54 being provided with fingers 55 which extend through openings provided in the inner backing plate 50. These fingers 55 are bent over, after being inserted in the opening in the backing plate 50, so as to provide a firm connection between the tubular housing and the inner backing plate 50. A cap 56 provided with an opening and seat 57 engages the rear side of the ball 38 and is provided with fingers 58 which enter a bayonet slot 59 in the tubular housing 54. The seat surrounding the opening 57 in the cap 56 engages the rear side of the ball 38. As in the construction shown in Figs. 1–4 a helical spring 60 is arranged within the tubular housing 54 and seats in the recess 53 provided in the inner backing plate 50. At its opposite end this spring 60 presses a washer 61 against the adjacent face of the ball 38 so as to obtain a firm frictional contact between the ball 38 and the cap 56.

It will be noted that the outer backing plate 51 is provided with an opening 62 through which the tubular housing 54 of the universal connection extends and that the outer backing plate 51 closely embraces this housing so as to conceal the connection between the tubular ball housing 54 and the inner backing plate 50 and providing a neat and attractive joint at this place.

In the form of the invention shown in Figs. 7–10 the mirror 30 is backed by an inner backing plate 65 of relatively heavy gage metal and this is in turn backed by a plate 66 of relatively light gage metal, the edges 67 of this outer backing plate 66 being turned over the margins of the inner backing plate 65 and the mirror 30 so as to permanently encase the mirror plate. The outer backing plate 66 is formed to provide an opening 68 and the inner backing plate 65 is formed to provide a neck 69 which projects rearwardly through the opening 68 and is provided with a plurality of radially outwardly projecting fingers 70 at its outer or rear end. The ball 38 is housed within a tubular housing 71 which is formed at its rear end with an opening 72 which receives the stem of the ball 38, as in the other forms of the invention. At its front end the tubular housing 71 is provided with a plurality of inwardly projecting fingers 73 which are arranged to register with the openings 74 between the fingers 70 on the neck 69 of the inner housing plate 65. In attaching the tubular housing 71 its fingers 73 are passed through the spaces 74 between the fingers 70 and the housing is thereafter given an eighth turn so that the fingers 73 of the tubular housing 71 are caught between the fingers 70 of the inner backing plate 65 and the adjacent rear face of the outer backing plate 66, as best shown in Fig. 7. In order to provide a quick means for attaching the mirror to the ball 38, both in assembling and removing and replacing the mirror, the opposite sides of the ball 38 are flattened, as indicated at 75 and the opening 72 in the tubular housing conforms to the cross sectional shape of the ball 47, as best shown in Fig. 10. Thus, the rear part of the tubular housing 71 is provided with two opposite jaws 76 which are spun inwardly to embrace the rear side of the ball 38 and the opposing edges of these jaws are parallel to one another. It is therefore apparent that by arranging the tubular housing 71, and its attached mirror plate, in a position in which the parallel edges of the jaws 76 are parallel with the flat faces 75 of the ball 38, the tubular casing 71 can be passed over the ball 38. Upon then twisting the mirror and the tubular housing 71 a quarter turn the round parts of the ball will be caught by the jaws 76. The ball 38 is held in firm frictional contact with the jaws 76 by a spring 77 which seats within a washer 78, this washer 78 being supported at its edges against the rear side of the neck 69 which is formed integrally to project rearwardly from the inner backing plate 65. The opposite end of the spring 77 bears against another washer 79 and holds this washer against the front face of the ball 38 and holds the ball in firm frictional contact with the jaws 76 of the tubular housing 71.

It is therefore apparent that in this form of the invention a neat and attractive connection is provided between the tubular housing 71 and the mirror backing plates and the ball 38, all of the removable connection parts being concealed within the tubular housing 71. At the same time the mirror can be readily removed by giving it a quarter turn so as to bring the flat opposite sides of the ball 38 into parallelism with the opposed edges of the jaws 76 whereupon the mirror plate and its associated parts can be withdrawn forwardly free from the ball 38.

In the form of the invention shown in Figs. 11 and 12, the mirror plate 30 is backed by an inner backing plate 80 of relatively heavy metal and a thin metal backing plate 81 the edges 82 of which are turned over the margins of the inner backing plate 80 and the mirror plate 30. The thin outer backing plate 81 is provided with an opening 83 and immediately in front of this hole the relatively heavy inner backing plate 80 is recessed, as indicated at 84. The tubular housing 85 is provided at one end with fingers 86 which project through openings at the sides of the recessed portion 84 of the inner backing plate and are turned over, as indicated in Fig. 12, to secure the housing 85 to the inner backing plate. The tubular housing 85 is closely fitted in the hole 83 of the thin metal outer backing plate 81 so as to provide a joint which is neat in appearance.

The rear end of the tubular housing 85 is formed in the same manner as the form of the invention shown in Figs. 7–10 having upper and lower jaws 87 which curve down to embrace and form a seat for the rear face of the ball 38 and having parallel opposing edges 88 which, when registering with the flat parts 75 of the ball permit the mirror and the housing 85 to be removed from the ball and support.

In the form of the invention shown in Figs. 13–17 the mirror 30 is backed by an inner backing plate 90 of relatively heavy metal and both are enclosed by an outer backing plate 91 of relatively thin metal, the edges 92 of which are turned over the margins of the inner backing plate 90 and the mirror. The outer thin metal backing plate 91 is provided with a hole 93 and the relatively thick inner metal backing plate 90 is provided with a smaller hole which registers with and is concentric with the hole 93. The ball 38 is enclosed in an inner tubular housing 94 which is formed at one end to provide a neck 95, this neck extending through the opening in the inner backing plate 90 and having its rim 96 spun outwardly to secure the housing to the inner backing plate 90. The tubular housing 94 is closely fitted in the hole 93 in the outer backing plate 91 so as to provide a joint which is neat in appearance. An outer tubular housing member 97 is fitted over the inner tubular housing member 94 and the outer tubular housing member 97 is preferably fitted against the rear side of the outer metal backing plate 91. The outer tubular housing member 97 is provided with an inwardly projecting rim 98 against which the rear sides of the ball 38 seats. This rim 98 is provided with a suitable number of recesses or notches 99 and the inner tubular housing member 94 is provided with a corresponding number of fingers 100 which are adapted to enter the notches and be turned over the rear end of the outer tubular housing member 97, as best shown in Fig. 13, thereby holding the outer housing member 97 against rearward displacement. The spring 101 within the housing members bears at one end against the front end of the inner housing member 94 and at its other end bears against the washer 102 which in turn bears against the ball 38 and holds this ball in frictional engagement with its seat on the flange 98.

Figure 19:
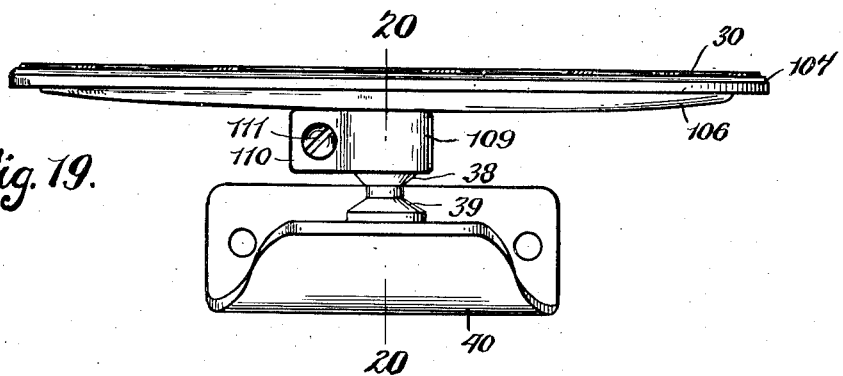
Fig. 19 is a top plan view thereof.
Figure 20:
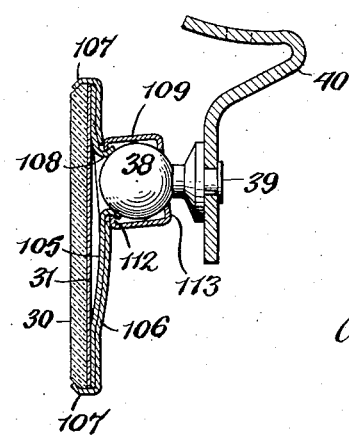
Fig. 20 is a section taken on line 20—20, Fig. 19.

In Figs. 18–20 is shown a form of the invention in which screw means are provided for securing the necessary friction in the universal joint in contradistinction to the springs shown in the preceding figures. In this form of the invention the mirror 30 is provided with an inner backing plate 105 of relatively heavy gage metal and an outer backing plate 106 of light gage metal, the edges 107 of which are spun around the corresponding margins of the inner backing plate 105 and the mirror 30. The outer backing plate 106 is provided with a central hole and that portion of the inner backing plate 105 defined by this hole is spun outwardly through the hole to provide an outwardly projecting neck 108. The front face of the ball 38 seats against this neck 108 and is held in frictional engagement therewith by a clamping ring 109. The free ends 110 of this clamping ring are drawn together by a bolt 111 and this clamping ring 109 is provided at its front side with a relatively shallow flange 112 which embraces the reduced part of the neck 108 and at its opposite side with a relatively broad flange 113 which engages and forms a seat for the rear side of the ball 38. Upon tightening the bolt 111 it is apparent that the flanges 112 and 113 are drawn into firmer engagement with the neck 108 and the ball 38 and consequently provide a firmer frictional engagement between the mirror and the ball.

In the form of the invention shown in Figs. 21–23 the mirror plate 30 is provided with an inner metal backing plate 115 of relatively heavy gage metal and an outer metal backing plate 116 of relatively light gage metal, the edges of the outer metal backing plate 116 being spun over the corresponding margins of the inner metal backing plate 115 to encase the two. In this form of the invention the outer metal backing plate 116 is formed to provide a relatively large central opening and the inner metal backing plate 115 is formed to provide a boss 117 which projects out through this opening. At its center this boss is formed to provide a seat 118 for the ball 38. This ball is housed by a housing cup 119, the rim of which closely fits around the boss 117 of the inner metal backing plate 115 and is held against the rear face of the outer backing plate 116 by a pair of bolts 120 which connect the rear side of the housing cup 119 with the boss 117. The cup 119 is provided at its rear side with an opening 121 through which the ball 38 projects and around this opening 121 the housing cup is formed to provide two jaws 122 the opposing edges of which are parallel with each other. The ball 38 is provided with the opposite flat faces 75 so that when these flat faces are brought parallel with the opposing edges of the jaws 122 the mirror assembly can be withdrawn without loosening the screws 120.

The form of the invention shown in Fig. 24 is similar to the form shown in Figs. 21–23 except that instead of providing two bolts 120 for tightening the housing cup 119a against the ball only one of such bolts is provided and the opposite side of the housing cup 119a is formed to provide a finger 125 which hooks into an opening provided in the side of the boss 117 of the inner metal backing plate 115. In other respects the two forms of the invention are identical.

Figure 25:
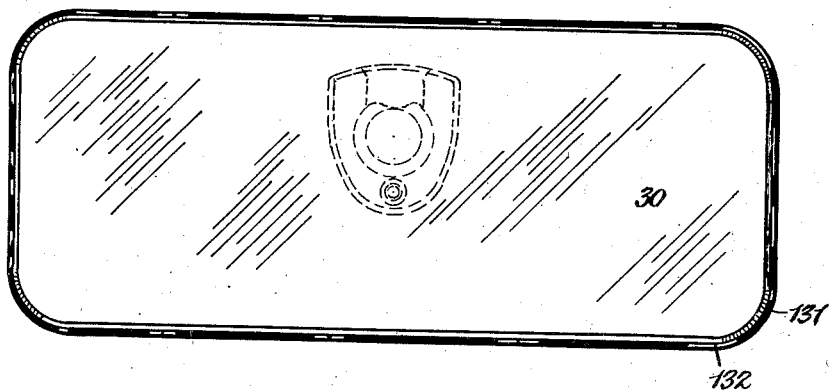
Fig. 25 is a view similar to Figs. 1, 18 and 21 and showing a further modified form of our invention.
Figure 26:
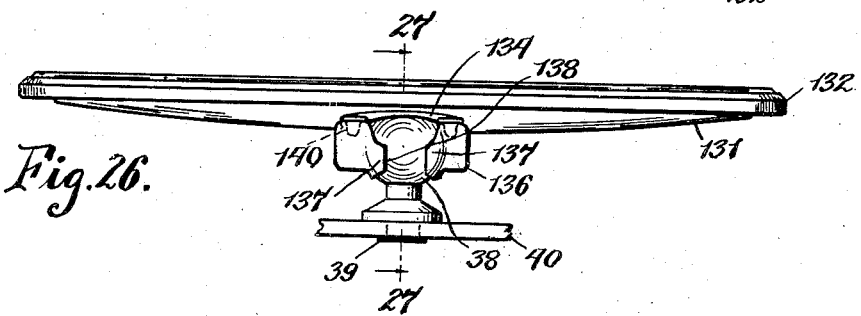
Fig. 26 is a top plan view thereof.
Figure 27:
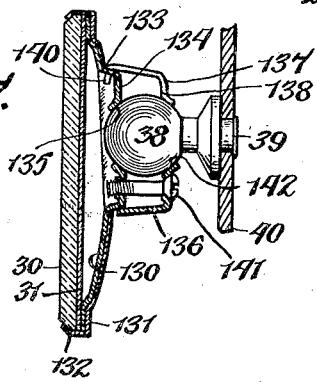
Fig. 27 is a section taken on line 27—27, Fig. 26.

The form of the invention shown in Figs. 25–27 is similar to the form of the invention shown in Fig. 24. In this form of the invention the mirror plate 30 is backed by a relatively heavy gage inner metal backing plate 130 and this in turn backed by a comparatively light gage outer metal backing plate 131, the edges 132 of which are spun over the margins of the inner metal backing plate 130 and the mirror 30 so as to engage and hold these parts together. The outer metal backing plate is provided with a hole 133 and the inner metal backing plate is formed to provide a boss 134 which projects through this hole 133. This boss 134 is formed with a central opening, the rim 135 of which forms a seat for the front face of the ball 38. The opposite or rear face of the ball 38 is engaged by a C-shaped clamping member 136 which extends around the underside of the ball 38 and the ends 137 of which are spaced apart to provide a passage 138 of sufficient size to receive the stem 139 of the ball. The two upwardly extending sides of the clamping member 136 are provided with fingers 140 which catch into openings provided in the upper side of the boss 134 and the lower part of the clamping member 137 is adjustably secured to the boss by a screw 141. This clamping member is formed to provide a seat 142 for the ball 38 so that upon tightening the screw 141 the ball 38 is frictionally grasped between the seats 142 and 135.

From the foregoing it is apparent that each of the forms of the invention shown provides an extremely attractive means for providing a universal mounting for a mirror, the mechanical parts of which are concealed within the ball housing. It is also apparent that the mounting can be assembled at low cost, particularly in point of using heavy gage metal where strength is required and light gage metal where only a housing is required and where it is desirable to spin or turn the metal over the edges of the mirror. It is also apparent that by the provision of flattened sides on the ball extremely quick means are provided for mounting and removing the mirror on the ball support. This is important both in the factory assembly of automobiles and rear vision mirrors and in providing for the ready replacement of rear vision mirrors. It is also apparent that in each of the forms of the invention shown the mounting is extremely simple and inexpensive in construction and at the same time is rigid and durable and will provide a vibrationless mounting for the rear vision mirror which is at the same time capable of being readily turned to meet the requirements of the driver.

We claim as our invention:

1. A bracket structure for mirrors and the like, comprising a support having a substantially spherical head, an inner sheet metal backing member for said mirror, an outer sheet metal backing member in rear of said inner backing member and having its edges turned to embrace and frame said mirror and inner backing member, said outer backing member being provided interiorly with an opening, a housing for said head and forming a seat for one side thereof, the part of said housing opposite said seat being closely fitted to said outer backing member adjacent said opening and secured to said inner backing member, means interposed between said inner backing member and head and forming a seat for the opposite side of said head and means holding said head in frictional engagement with said seat.

2. A bracket structure for mirrors and the like, comprising a support having a substantially spherical head, an inner relatively heavy gage sheet metal backing member for said mirror, an outer relatively light gage sheet metal backing member in rear of said inner backing member and having its edges turned to embrace and frame said mirror and inner backing member, said outer backing member provided interiorly with an opening, a housing for said head and forming a seat for one side thereof, the part of said housing opposite said seat being closely fitted to said outer backing member adjacent said opening and secured to said inner backing member, means interposed between said inner backing member and head and forming a seat for the opposite side of said head and means holding said head in frictional engagement with said seat.

3. A bracket structure for mirrors and the like, comprising a support having a substantially spherical head, an inner backing member for said mirror, an outer sheet metal backing member in rear of said inner backing member and having its edges turned to embrace and frame said mirror and inner backing member, said outer backing member being provided interiorly with an opening and said inner backing member being provided within the space defined by said opening with a shoulder, a sheet metal member of generally annular form and open at its opposite ends and housing said head and closely fitted to said outer backing member adjacent said opening, one end edge of said annular member being formed to provide a seat for the corresponding side of said head and the opposite edge being adapted to engage and be secured to said shoulder, means interposed between said inner backing member and head and forming a seat for the opposite side of said head and movable means for holding said head in frictional engagement with its seats.

4. A bracket structure for mirrors and the like, comprising a support having a substantially spherical head, an inner backing member for said mirror, an outer sheet metal backing member in rear of said inner backing member and having its edges turned to embrace and frame said mirror and inner backing member, said outer backing member being provided interiorly with an opening and said inner backing member being provided in the space defined by said opening with a depression and with shoulders around said depression, a sheet metal member of generally annular form and open at its opposite ends and housing said head and closely fitted to said outer backing member adjacent said opening, one end edge of said annular member being formed to provide a seat for the corresponding side of said head and the opposite edge being secured to said shoulders, means interposed between said shoulders and head and forming a seat for the opposite side of said head and movable means for holding said head in frictional engagement with its seats.

5. A bracket structure for mirrors and the like, comprising a support having a substantially spherical head, an inner backing member for said mirror, an outer backing member in rear of said inner backing member and having its edges turned to embrace and frame said mirror and inner backing member, said outer backing member being provided interiorly with an opening, a sheet metal member of generally annular form secured to the rear of said inner backing member through said opening and housing said head, the rear end of said annular member being open, a cap secured around said annular member, one end of said cap being fitted to one of said backing members and the other end being formed to extend around the open rear end of said annular member and form a seat for the corresponding side of said head, a spring interposed between said inner backing member and said head and a washer urged by said spring against the corresponding side of said head.

6. A bracket structure for mirrors and the like, comprising a support having a substantially spherical head, an inner backing member for said mirror, an outer backing member in rear of said inner backing member and having its edges turned to embrace and frame said mirror and inner backing member, said outer backing member being provided interiorly with an opening and said inner backing member being provided in that part defined by said opening with shoulders, a sheet metal member of generally annular form provided at one end with fingers hooking around said shoulders to secure it to said inner backing member, the opposite end of said annular member being open to receive said head, shoulders formed at the said opposite end of said annular member to form a seat for said head, a helical compression spring arranged in said annular member and interposed between said inner backing member and said head and urging said head against said seating shoulders and a washer interposed between said head and spring.

7. A bracket structure for mirrors and the like, comprising a support having a substantially spherical head, an inner backing member for said mirror, an outer backing member in rear of said inner backing member and having its edges turned to embrace and frame said mirror and inner backing member, said outer backing member being provided interiorly with an opening and said inner backing member being provided in that part exposed through said opening with an annular depression, a sheet metal member of generally annular form fitted at one end in said depression and secured to said inner backing member, the opposite end of said annular member being open to receive said head, a shoulder formed at said opposite end of said annular member to form a seat for said head, a helical compression spring arranged in said annular member and interposed between said inner backing member and said head and urging said head toward said seating shoulders and a washer interposed between said head and spring.

8. A bracket structure for mirrors and the like, comprising a support having a substantially spherical head, an inner sheet metal backing member for said mirror, an outer sheet metal backing member in rear of said inner backing member and having its edges turned to embrace and frame said mirror and inner backing member, said outer backing member being provided interiorly with an opening, a housing for said head and forming a seat for one side thereof, the part of said housing opposite said seat being secured exclusively to said inner backing member through means projecting through said opening, means interposed between said inner backing member and head and forming a seat for the opposite side of said head and means for holding said head in frictional engagement with said seat.

9. A bracket structure for mirrors and the like, comprising a support having a substantially spherical head, an inner sheet metal backing member for said mirror, an outer sheet metal backing member in rear of said inner backing member and having its edges turned to embrace and frame said mirror and inner backing member, said outer backing member being provided interiorly with an opening, a housing for said head and forming a seat for one side thereof, the part of said housing opposite said seat secured exclusively to said inner backing member through means projecting through said opening, said inner backing member providing a seat for the opposite side of said head and means for holding said head frictionally between said housing and inner backing member.

10. Means for supporting a mirror or the like, comprising a supporting bracket, a bracket secured to said mirror, a ball connected to and projecting outwardly from one of said brackets, the other bracket being provided with an opening and being provided with a laterally projecting flange formed to provide a marginal U-shaped channel around said opening, an open ended tubular socket fitting at one end around said opening and flange and having a flange at its rim anchored in said channel, said socket receiving said ball, a yielding cushion in said socket and seated against the shoulder formed by said flange and yieldingly resisting relative movement of said ball and socket and means at the outer end of said socket for retaining said ball in said socket.

WILLIAM LA HODNY.
WILLIAM SZYMINSKI.